(12) United States Patent
Jing

(10) Patent No.: US 7,726,867 B2
(45) Date of Patent: Jun. 1, 2010

(54) BACKLIGHT MODULE WITH CONDUCTIVE MECHANISMS THEREIN FOR PROVIDING POWER TO LAMPS THEREOF

(75) Inventor: Xiao-Hong Jing, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 199 days.

(21) Appl. No.: 12/005,801

(22) Filed: Dec. 27, 2007

(65) Prior Publication Data

US 2008/0158910 A1 Jul. 3, 2008

(30) Foreign Application Priority Data

Dec. 29, 2006 (TW) .............................. 95149706 A

(51) Int. Cl.
*F21V 7/04* (2006.01)
*F21V 8/00* (2006.01)

(52) U.S. Cl. ..................... 362/633; 362/632; 362/634; 362/614

(58) Field of Classification Search ............ 362/217.08, 362/217.09, 221, 225, 630–634, 614
See application file for complete search history.

(56) References Cited

U.S. PATENT DOCUMENTS

| 7,004,613 B2 * | 2/2006 | Sun et al. ..................... 362/630 |
| 7,204,633 B2 | 4/2007 | Yun |
| 7,325,963 B2 * | 2/2008 | Chang et al. ................. 362/633 |
| 2001/0006459 A1 * | 7/2001 | Okumura ..................... 362/31 |

\* cited by examiner

*Primary Examiner*—Stephen F Husar
*Assistant Examiner*—James W Cranson
(74) *Attorney, Agent, or Firm*—Wei Te Chung

(57) ABSTRACT

An exemplary backlight module (20) includes a lamp (231), a power supply for providing power to the lamp, and a frame (27) for receiving the lamp. The frame includes at least one lamp connecting mechanism. Each lamp connecting mechanism includes two electrical connecting tubes drill through the frame. Two ends of each lamp are electrically connected to the connecting tubes respectively at an inner side of the frame. Both of the connecting tubes are electrically connected to the power supply.

20 Claims, 6 Drawing Sheets

BACKLIGHT MODULE WITH CONDUCTIVE MECHANISMS THEREIN FOR PROVIDING POWER TO LAMPS THEREOF

FIELD OF THE INVENTION

The present invention relates to backlight modules, and more particularly to a backlight module with conductive mechanisms therein, power can be supplied to lamps employed in the backlight modules via the conductive mechanisms.

GENERAL BACKGROUND

Liquid crystal of a liquid crystal display (LCD) does no itself emit light. Therefore it is common for a backlight module to be installed in an LCD together with the LCD. The backlight module provides uniform flat light to enable the LCD to display images.

FIG. 7 is an isometric, exploded view of a conventional backlight module. The backlight module 10 includes a frame 15, a light guide plate 11, a lamp assembly 13, and a bottom tray 17. The frame 15 coupled with the bottom tray 17 cooperatively defines a space for receiving the light guide plate 11 and the lamp assembly 13.

The light guide plate 11 includes a side surface 111 for receiving light beams emitted by the lamp assembly 13, and a top surface 113 for outputting flat light. The lamp assembly 13 includes a lamp 131, two fastening units 133 fixed at two ends of the lamp 131, two wires 137 electrically connected with the two ends of the lamp 131 for providing power to the lamp 131, and a lamp cover 132. The lamp cover 132 coupled with the side surface 111 of the light guide plate 11 and the two fastening units 133 cooperatively defines a closed space (not labeled) for receiving the lamp 131.

The frame 15 includes a side wall 151 corresponding to the side surface 111 of the light guide plate 11. The side wall 151 of the frame 15 includes two openings 1511 corresponding to the two ends of the lamp 131. The bottom tray 17 includes a side wall 171 corresponding to the side surface 111 of the light guide plate 11. The side wall 171 of the bottom tray 17 includes two openings 1711 corresponding to the openings 1511 of the frame 15.

The backlight module 10 is assembled by the following steps: firstly, the lamp 131 is received in the lamp cover 132. Subsequently, the light guide plate 11 is received in the frame 15. The side surface 111 of the light guide plate 11 is located adjacent to the side wall 151 of the frame 15. The side surface 111 of the light guide plate 11 together with the frame 15 defines a space for receiving the lamp assembly 13. Afterwards, the lamp assembly 13 is received in the space defined by the light guide plate 11 and the frame 15. The wires 137 of the lamp assembly 13 extend out of the frame 15 via the openings 1511, respectively. Finally, as shown in FIG. 8, the assembled frame 15 is located in the bottom tray 17 and the wires 137 of the lamp assembly 13 extend out of the bottom tray 17 via the openings 1711.

Typically, the wires 137 are soldered at the ends of the lamp 131. When the backlight module 10 is assembled, the wires 137 of the lamp assembly 13 are liable to be damaged. For example, the wires 137 are liable to be broken away from the lamp 131 by external forces. If this happens, the backlight module 10 should be re-assembled to replace the damaged wires 137. This is disadvantageous in mass production of the backlight module 10.

What is needed, therefore, is a backlight module that can overcome the above-described deficiencies.

SUMMARY

A backlight module includes at least one lamp, a power supply for providing power to the least one lamp, and a frame for receiving the at least one lamp. The frame includes at least one lamp connecting mechanism. Each lamp connecting mechanism includes two electrical connecting tubes drill through the frame. Two ends of each lamp are electrically connected to the connecting tubes respectively at an inner side of the frame. Both of the connecting tubes are electrically connected to the power supply.

A backlight module includes at least one lamp and a frame for receiving the at least one lamp. The frame includes a first conductive mechanism and a second conductive mechanism. Parts of the first and second conductive mechanism are drill through the frame. The at least one lamp is electrically connected to the first and second mechanisms at inner side of the frame. The first and second mechanisms are connected to a power supply at out side of the frame.

Other novel features and advantages will become more apparent from the following detailed description when taken in conjunction with the accompanying drawings.

DETAILED DESCRIPTION OF PREFERRED EMBODIMENTS

Reference will now be made to the drawings to describe the preferred and exemplary embodiments in detail.

Figure 1:
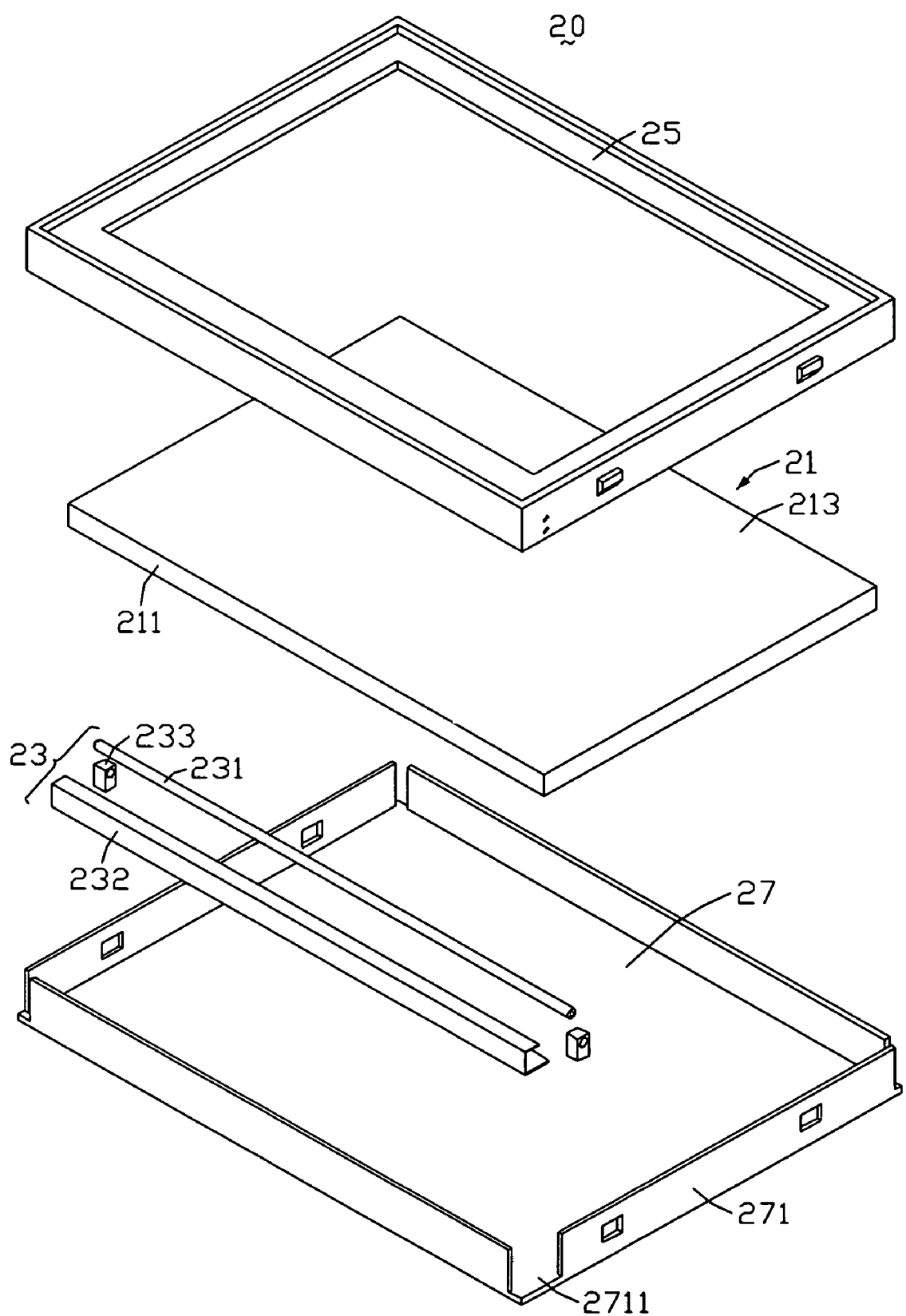
FIG. 1 is an isometric, exploded view of a backlight module according to an exemplary embodiment of the present invention, the backlight module including a frame.

FIG. 1 is an isometric, exploded view of a backlight module according to an exemplary embodiment of the present invention. The backlight module 20 includes a frame 25, a light guide plate 21, a lamp assembly 23, and a bottom tray 27. The frame 25 coupled with the bottom tray 27 cooperatively defines a space for receiving the light guide plate 21 and the lamp assembly 23. The frame 25 may be made of plastic.

The light guide plate 21 includes a side surface 211 for receiving light beams emitted by the lamp assembly 23, and a top surface 213 for outputting flat light. The lamp assembly 23 includes a lamp 231, two fastening units 233, and a lamp cover 232. The lamp cover 232 coupled with the side surface 211 of the light guide plate 21 and the two fastening units 233 cooperatively defines a space (not labeled) for receiving the lamp 231. The bottom tray 27 includes a side wall 271. In the illustrated embodiment, the lamp 231 may be a cold cathode fluorescent lamp (CCFL). The fastening units 233 may be made of rubber. Each of the fastening units 233 includes a through hole (not labeled). The side wall 271 together with an adjacent side wall (not labeled) of the bottom tray 27 forms a gap 2711 corresponding to one terminal of the lamp 231.

Figure 2:
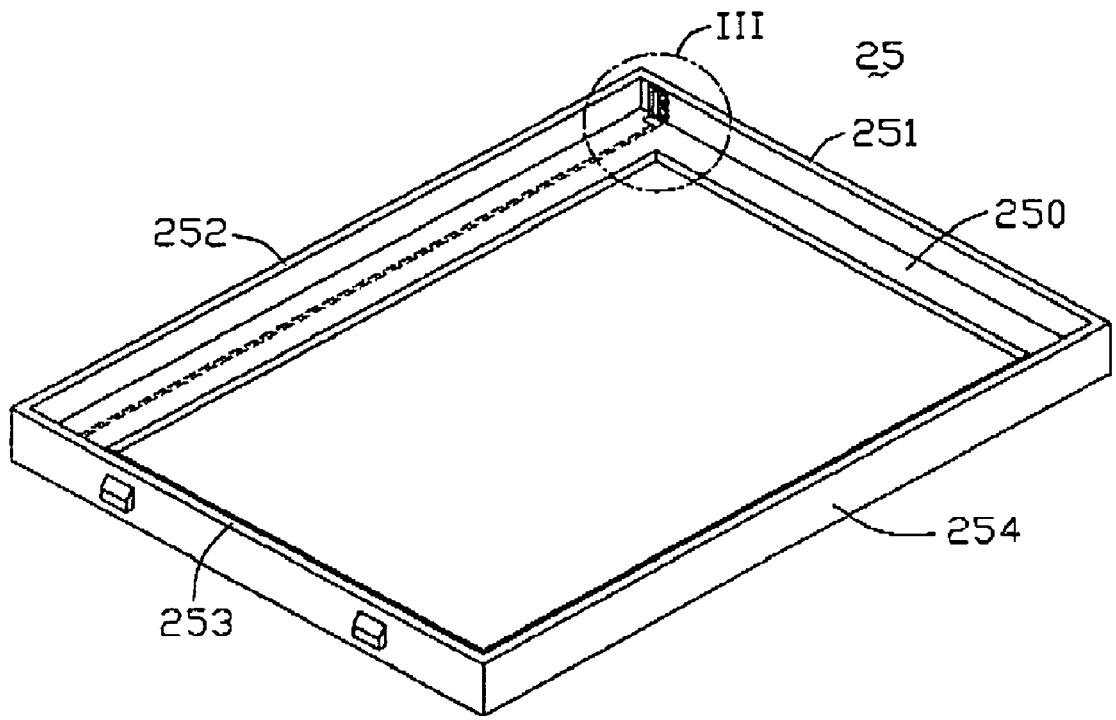
FIG. 2 is an overturned view of the frame of FIG. 1.

Referring also to FIG. 2, this is an overturned view of the frame 25 of FIG. 1. The frame 25 includes a first side wall 251, a second side wall 252, a third side wall 253 opposite to the first side wall 251, a fourth side wall 254 opposite to the second side wall 252, and a supporting board 250 perpendicularly extending from inner surfaces of the first, second, third, and fourth side walls 251, 252, 253, 254. The first, second, third, and fourth side walls 251, 252, 253, 254 are joined end to end.

Figure 3:
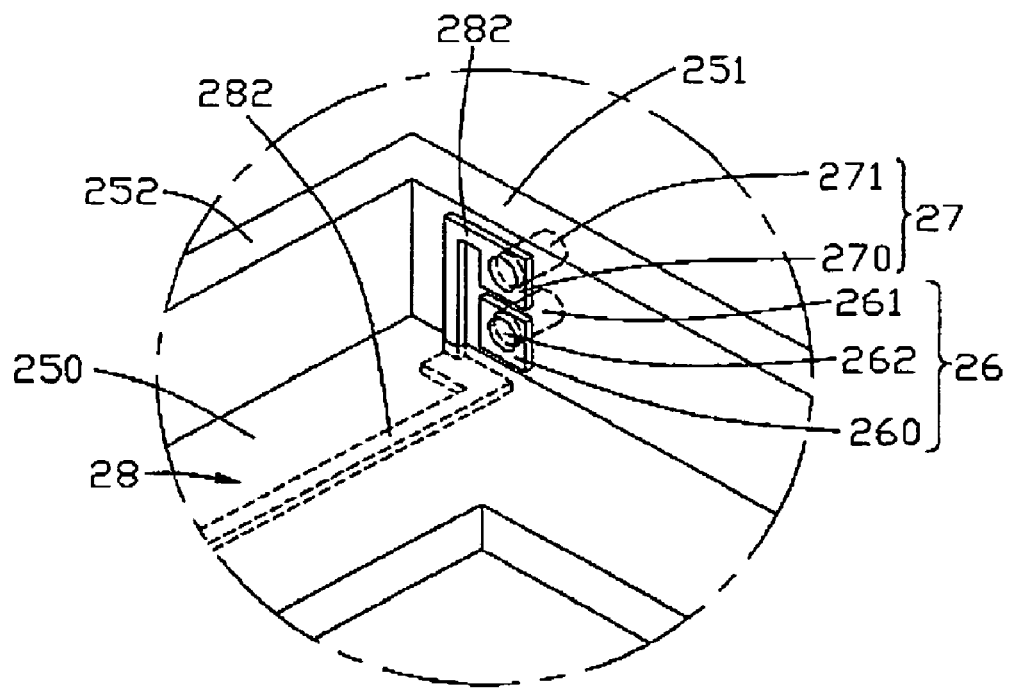
FIG. 3 is an enlarged view of a circled portion III of FIG. 2.

Referring also to FIG. 3, this is an enlarged view of a circled portion III of FIG. 2. The first side wall 251 includes a first electrical lamp connector 26 and a second electrical lamp connector 27. The first and second electrical lamp connectors 26, 27 have similar structures, and are electrically connected to electrodes of the lamp 231, respectively. The first and second electrical lamp connectors 26, 27 are located at the first side wall 251 corresponding to the gap 2711 of the bottom tray 27.

The first electrical lamp connector 26 includes a first electrode pad 260 formed on inner surface of the first side wall 251, an elastic member 262 electrically connected with the first electrode pad 260, and a first connecting tube 261 electrically connected with the first electrode pad 260.

The second electrical lamp connector 27 includes a second electrode pad 270 and a second connecting tube 271 electrically connected with the second electrode pad 270. The first and second connecting tubes 261, 271 drill through the first side wall 251 and are embedded in the first side wall 251. The first and second connecting tubes 261, 271 are provided to receive external electrical plugs (not shown) to provide power for the lamp 231.

Figure 4:
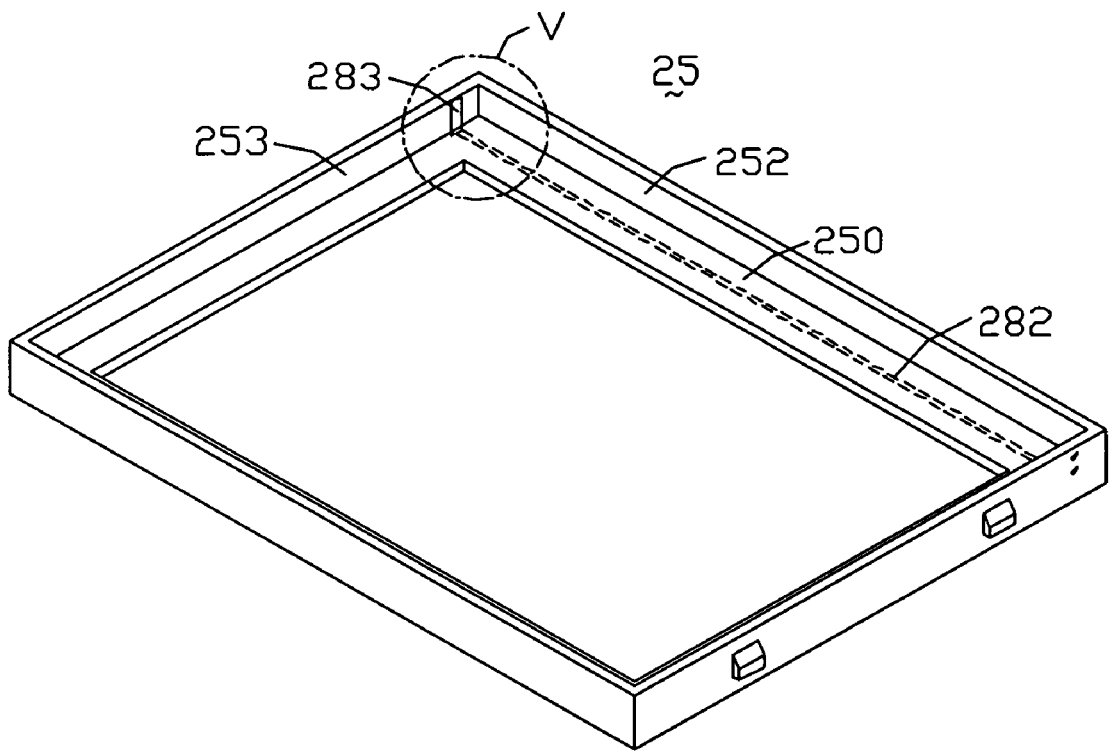
FIG. 4 is an another side view of the frame of FIG. 2.
Figure 5:
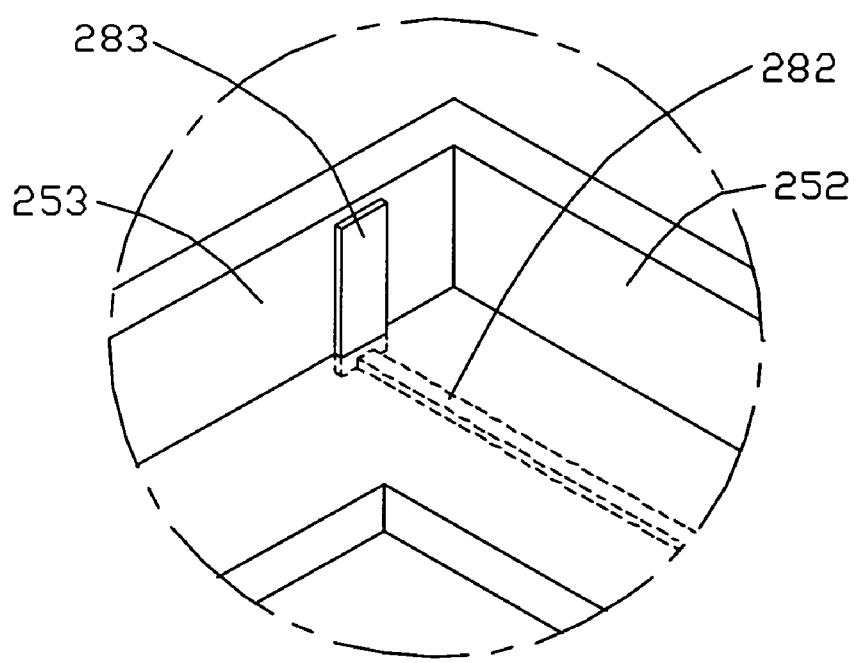
FIG. 5 is an enlarged view of a circled portion V of FIG. 4

Referring also to FIGS. 4 and 5, FIG. 4 is another side view of the frame 25 of FIG. 2. FIG. 5 is an enlarged view of a circled portion V of FIG. 4. The third side wall 253 of the frame 25 includes a third electrical lamp connector 283 formed on the inner surface of the third side wall 253 and facing the first electrical lamp connector 26 of the first side wall 251. The third electrical lamp connector 283 may be a metallic elastic plate. The third electrical lamp connector 283 coupled with the elastic member 262 of the first electrical lamp connector 26 tightly fastens the lamp 231 therebetween.

The third electrical lamp connector 283 is electrically connected to the second electrical lamp connector 27 of the first side wall 251. In the illustrated embodiment, the third electrical lamp connector 283 is electrically connected to the second electrical lamp connector 27 via a metallic plate 282. One terminal of the metallic plate 282 is connected to the third electrical lamp connector 283. Part of the metallic plate 282 corresponding to the supporting board 250 is embedded in the supporting board 250. Another part of the metallic plate 282 is formed at the inner surface of the first side wall 251 and is connected to the second electrode pad 270 of the second electrical lamp connector 27. The first, second, and third electrical lamp connectors 26, 27, 283, and the metallic plate 282 are integrated with the frame 25 to form one body during the process of fabricating the frame 25.

Figure 6:
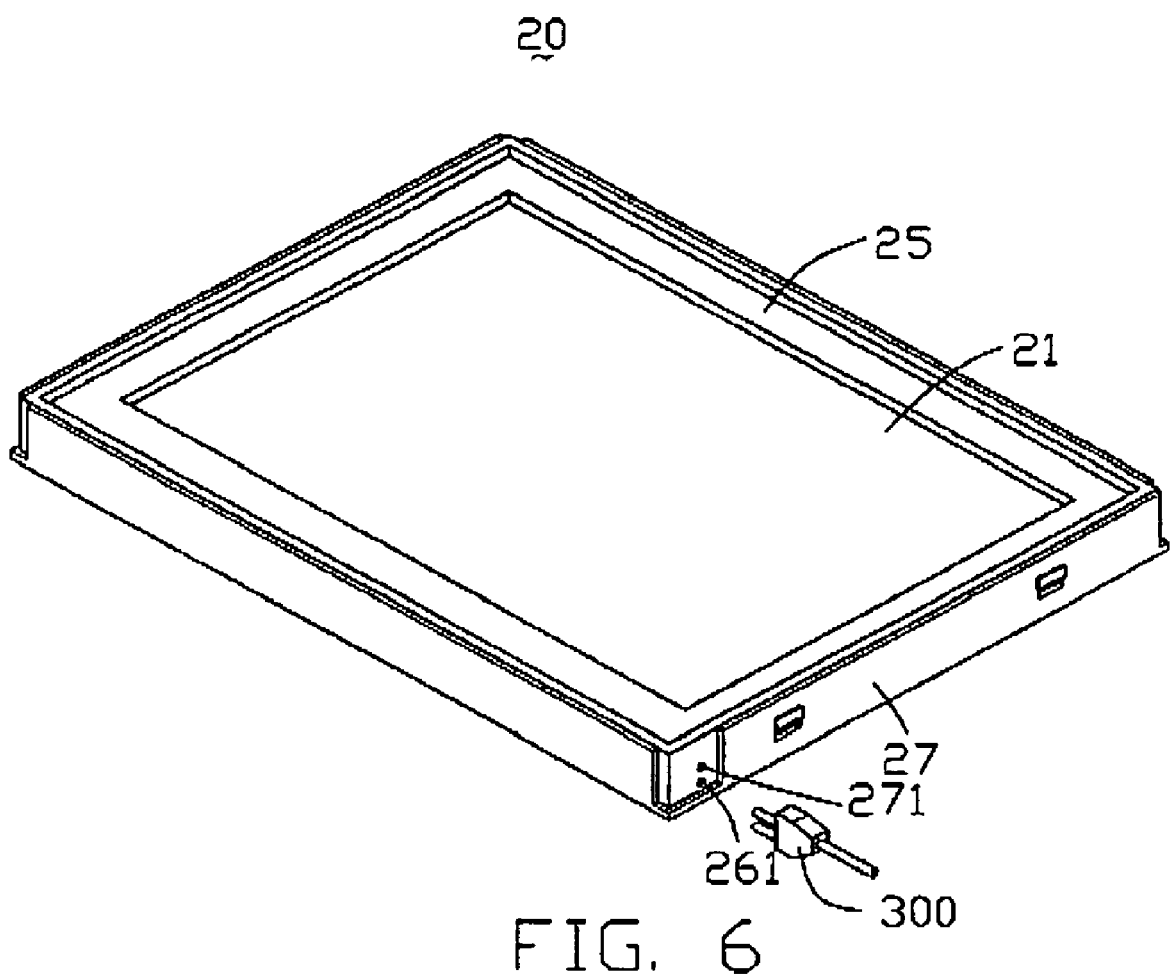
FIG. 6 is an assembled view of the backlight module of FIG. 1.
Figure 7:
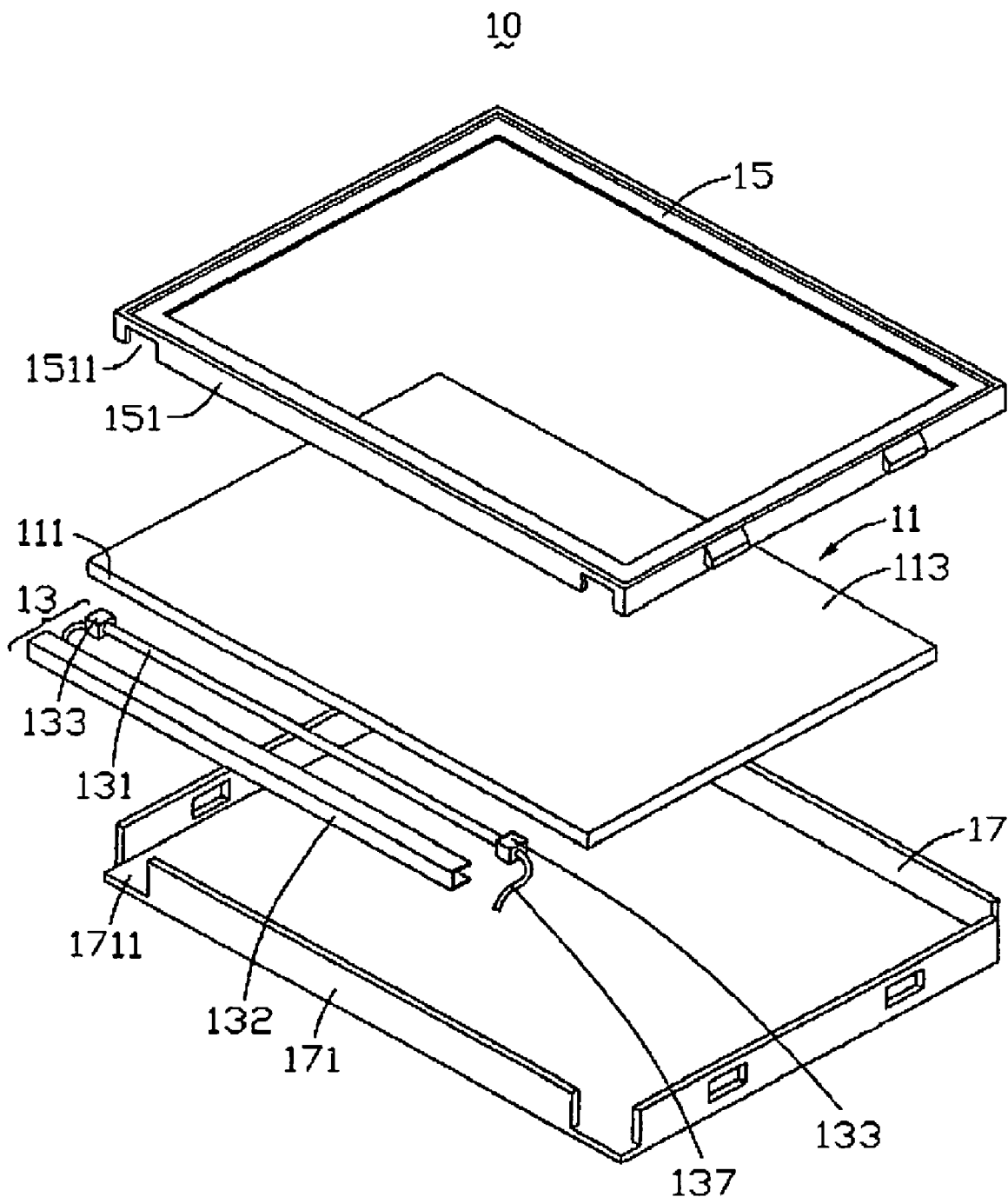
FIG. 7 is an isometric, exploded view of a conventional backlight module.
Figure 8:
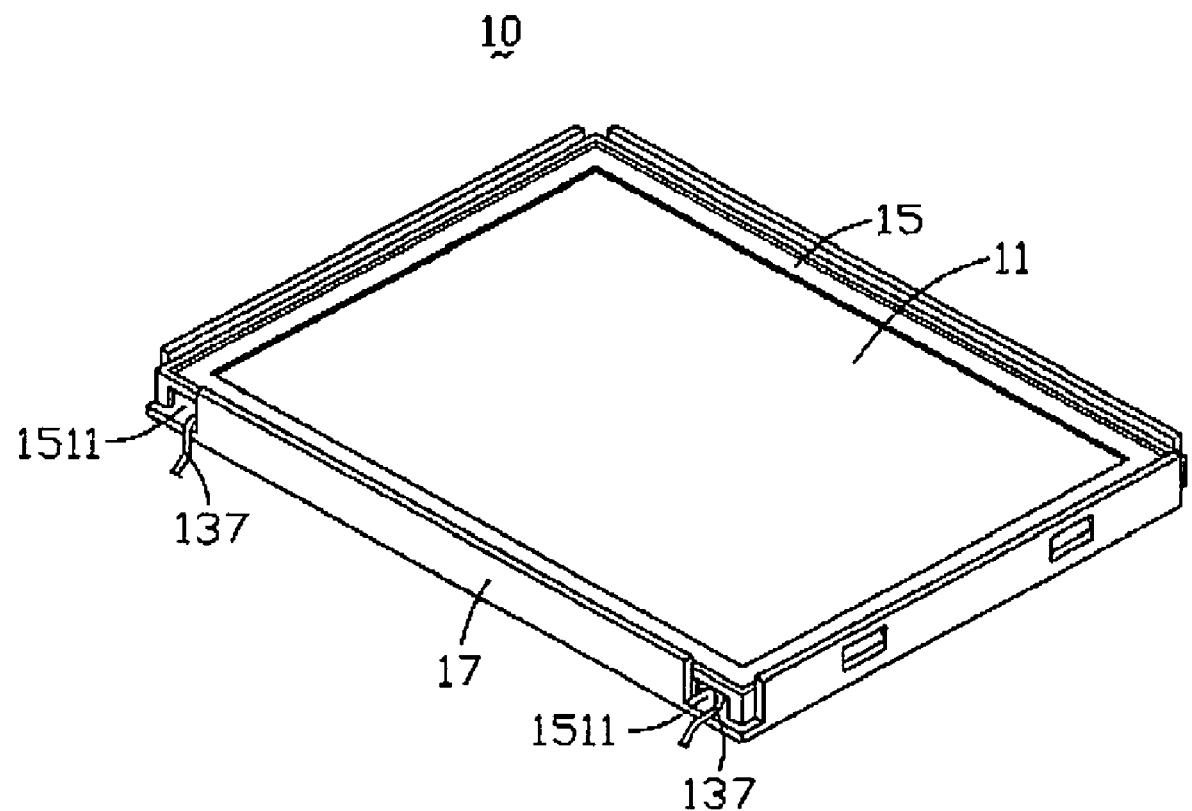
FIG. 8 is an assembled view of the backlight module of FIG. 7.

The backlight module 20 is assembled by the following steps: firstly, the lamp 231 is received in the lamp cover 232. Secondly, the light guide plate 21 is received in the frame 25. The side surface 211 of the light guide plate 21 is adjacent to the second side wall 252 of the frame 25. The side surface 211 of the light guide plate 21 together with the frame 25 defines a space for receiving the lamp assembly 23. Subsequently the lamp assembly 23 is received in the space defined by the light guide plate 21 and the frame 25. A high voltage terminal (not labeled) of the lamp 231 contacts the elastic member 262 of the first electrical lamp connector 26 via the through hole of a corresponding fastening unit 233. A low voltage terminal (not labeled) of the lamp 231 contacts the third electrical lamp connector 283 via the through bole of a corresponding fastening unit 233. Afterwards, the assembled frame 25 is located in the bottom tray 27. The first and second connecting tubes 261, 271 of the frame 25 are located corresponding to the gap 2711 of the bottom tray 27 as shown in FIG. 6. Finally, an external electrical plug 300 are inserted into the first and second connecting tubes 261, 271 of the frame 25 for providing power for the lamp 231.

As detailed above, the lamp 231 is fastened between the first and third electrical lamp connectors 26, 283 of the frame 25. The high and low voltage terminals of the lamp 231 are electrically connected with the first and second electrical lamp connectors 26, 27, respectively. After the backlight module 20 is assembled, external electrical plugs are inserted into the first and second connecting tubes 261, 271 of the frame 25 for providing power for the lamp 231. That is, the backlight module 20 needs no lamp wire to provide power for the lamp 231. This omits a process of soldering the lamp wires to the lamp 231. In addition, when the backlight module 20 is assembled, there is no need to assemble the lamp wires. As a result, the backlight module 20 may be assembled more quickly. In mass production, this is advantageous to improve the productivity of manufacturing the backlight modules 20.

Various modifications and alterations to the above-described embodiments are possible. For example, the backlight module 20 may include two or more lamps 231. Accordingly, the frame 25 includes two or more first and third electrical lamp connectors 26, 28 to provide power for the lamps 231. The elastic member 262 of the first electrical lamp connector 26 may be a metallic spring electrically connected to the first electrode pad 260. The metallic plate 282 may be a wire and the wire may be embedded in the second side wall 252 of the frame 25.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
   at least one lamp; and
   a frame for receiving the at least one lamp, the frame comprising:
      at least one lamp connecting mechanism, each lamp connecting mechanism of the at least one lamp connecting mechanism comprising two electrical connecting tubes drilled through the frame, a first electrical lamp connector, a second electrical lamp connector, and a third electrical lamp connector, the electrical connecting tubes arranged at the first and second electrical lamp connectors respectively;
   wherein two ends of a corresponding lamp of the at least one lamp are electrically connected to the connecting tubes respectively at an inner side of the frame, the corresponding lamp is fastened between the first and third electrical lamp connectors, and the connecting tubes are capable of receiving a power voltage to light the corresponding lamp.

2. The backlight module as claimed in claim 1, wherein the first electrical lamp connector comprises an electrode pad formed at the inner side of the frame, and the electrode pad is electrically connected to the corresponding connecting tube of the first electrical lamp connector.

3. The backlight module as claimed in claim 2, wherein the first electrical lamp connector further comprises an elastic member formed at the electrode pad.

4. The backlight module as claimed in claim 1, wherein the second electrical lamp connector comprises an electrode pad formed at the inner side of the frame, and the electrode pad is electrically connected to the corresponding connecting tube of the second electrical lamp connector.

5. The backlight module as claimed in claim 1, wherein the third electrical lamp connector is electrically connected to the second electrical lamp connector.

6. The backlight module as claimed in claim 5, wherein the third electrical lamp connector is electrically connected to the second electrical lamp connector via a metallic plate.

7. The backlight module as claimed in claim 5, wherein the frame further comprises a first side wall, a second side wall, a third side wall opposite to the first side wall, and a fourth side wall opposite to the second side wall.

8. The backlight module as claimed in claim 7, wherein the first and second electrical lamp connectors are located in the first side wall.

9. The backlight module as claimed in claim 7, wherein the third electrical lamp connector is located in the third side wall facing the first electrical lamp connector.

10. The backlight module as claimed in claim 7, wherein the frame further comprises a supporting board extending from inner surfaces of the frame.

11. The backlight module as claimed in claim 10, wherein the third electrical lamp connector is electrically connected to the second electrical lamp connector via a metallic plate embedded in the supporting board of the frame.

12. The backlight module as claimed in claim 1, wherein the third electrical lamp connector is a metallic plate.

13. The backlight module as claimed in claim 1, wherein the first, second, and third electrical lamp connectors are integrated with the frame to form one body.

14. The backlight module as claimed in claim 1, further comprising a bottom tray coupled with the frame cooperatively to define a space for receiving the at least one lamp.

15. The backlight module as claimed in claim 14, wherein two adjacent side walls of the bottom tray define a gap corresponding to the first and second electrical lamp connectors of the frame.

16. A backlight module, comprising:
at least one lamp; and
a frame receiving the at least one lamp, the frame comprising:
at least one lamp connecting mechanism, each lamp connecting mechanism of the at least one lamp connecting mechanism comprising:
two electrical connecting tubes drilled through a same side wall of the frame;
a first electrical lamp connector; and
a second electrical lamp connector, the electrical connecting tubes arranged at the first and second lamp connectors respectively;
wherein two ends of a corresponding lamp of the at least one lamp are electrically connected to the connecting tubes, respectively, at an inner side of the frame, and the connecting tubes are capable of receiving a power voltage to light the corresponding lamp.

17. The backlight module as claimed in claim 16, wherein at least one of the first and second electrical lamp connectors comprises an electrode pad formed at an inner side of the frame, and the electrode pad is electrically connected to a corresponding connecting tube.

18. The backlight module as claimed in claim 17, wherein each lamp connecting mechanism of the at least one lamp connecting mechanism further comprises a third electrical lamp connector arranged at another side wall of the frame facing the first electrical lamp connector, and the two ends of the corresponding lamp contact the third electrical lamp connector and the first electrical lamp connector respectively in order to be electrically connected between the first and third electrical lamp connectors.

19. The backlight module as claimed in claim 18, wherein the second and third electrical lamp connectors are electrically connected with each other.

20. A backlight module, comprising:
at least one lamp; and
a flame for receiving the at least one lamp, the frame comprising:
at least one lamp connecting mechanism, each lamp connecting mechanism of the at least one lamp connecting mechanism comprising two electrical connecting tubes drilled through the frame, a first electrical lamp connector and a second electrical lamp connector, the electrical connecting tubes arranged at the first and second lamp connectors respectively;
wherein the first electrical lamp connector comprises an electrode pad formed at an inner side of the frame, the electrode pad is electrically connected to the corresponding connecting tube of the first lamp connector, two ends of a corresponding lamp of the at least one lamp are electrically connected to the connecting tubes respectively at the inner side of the frame, and the connecting tubes arc capable of receiving a power voltage to light the corresponding lamp.

\* \* \* \* \*